US012810018B2

(12) United States Patent
Ankrom et al.

(10) Patent No.: US 12,810,018 B2
(45) Date of Patent: Nov. 24, 2026

(54) ACCESS MANAGER THAT LIMITS ACCESS TO USER INFORMATION USING AUTHENTICATION AND VERIFICATION

(71) Applicant: Oracle International Corporation, Redwood Shores, CA (US)

(72) Inventors: Zachary S. Ankrom, Austin, TX (US); Kamran Khaliq, Ashburn, VA (US)

(73) Assignee: Oracle International Corporation, Redwood Shores, CA (US)

( * ) Notice: Subject to any disclaimer, the term of this patent is extended or adjusted under 35 U.S.C. 154(b) by 207 days.

(21) Appl. No.: 18/489,129

(22) Filed: Oct. 18, 2023

(65) Prior Publication Data

US 2024/0126922 A1 Apr. 18, 2024

Related U.S. Application Data

(60) Provisional application No. 63/501,742, filed on May 12, 2023, provisional application No. 63/497,528,
(Continued)

(51) Int. Cl.
*G06F 21/62* (2013.01)
*G06F 21/31* (2013.01)
(Continued)

(52) U.S. Cl.
CPC .......... *G06F 21/6245* (2013.01); *G06F 21/31* (2013.01); *G06F 21/32* (2013.01);
(Continued)

(58) Field of Classification Search
CPC .... G06F 21/32; G06F 21/6245; G06F 21/602; G06F 21/606; H04L 9/50; H04L 63/10; H04L 63/083; H04L 63/08; H04L 63/0853
(Continued)

(56) References Cited

U.S. PATENT DOCUMENTS 8,275,632 B2 * 9/2012 Awaraji ............... G06Q 50/265 705/2
9,855,785 B1 1/2018 Nagelberg et al.
(Continued)

FOREIGN PATENT DOCUMENTS

| | | | |
|---|---|---|---|
| KR | 20220129245 | A | 9/2022 |
| WO | 2016063092 | A1 | 4/2016 |
| WO | 2019246568 | A1 | 12/2019 |

OTHER PUBLICATIONS

NPL Search Terms (Year: 2025).*
(Continued)

*Primary Examiner* — Syed A Zaidi
(74) *Attorney, Agent, or Firm* — Potomac Law Group PLLC

(57) ABSTRACT

Embodiments permit scope limited access to a user's secure information using credential authentication and user information verification. Certain information sharing protocols can require an explicit grant to share a user's secure information with a requesting entity. In some scenarios such an explicit grant may be impractical, such as when the user is not available to provide such an explicit grant. Embodiments of a secure information manager can permit a vetted entity scope and time limited access to a user's secure information in such scenarios, for example when the vetted entity provides an assertion that the user is unable to provide an explicit grant. For example, in scenario(s) with exigent circumstances, the secure information manager can permit the vetted entity to access a limited scope of user information that corresponds to the vetted entity's relationship to the user, role in a workflow, or other suitable characteristics of the vetted entity.

20 Claims, 6 Drawing Sheets

Related U.S. Application Data filed on Apr. 21, 2023, provisional application No. 63/493,150, filed on Mar. 30, 2023, provisional application No. 63/493,155, filed on Mar. 30, 2023, provisional application No. 63/417,321, filed on Oct. 18, 2022.

(51) Int. Cl.

| | |
|---|---|
| ***G06F 21/32*** | (2013.01) |
| ***G06F 21/60*** | (2013.01) |
| ***H04L 9/00*** | (2022.01) |
| ***H04L 9/40*** | (2022.01) |

(52) U.S. Cl.

CPC .......... *G06F 21/602* (2013.01); *G06F 21/606* (2013.01); *H04L 9/50* (2022.05); *H04L 63/083* (2013.01); *H04L 63/0853* (2013.01); *H04L 63/10* (2013.01)

(58) Field of Classification Search

USPC ................. 726/21, 4, 28, 5, 19, 2, 26, 27, 3

See application file for complete search history.

(56) References Cited

U.S. PATENT DOCUMENTS

| | | | | |
|---|---|---|---|---|
| 11,063,770 | B1 | 7/2021 | Peng | |
| 11,443,838 | B1 * | 9/2022 | Cordonnier | G16H 50/70 |
| 12,106,288 | B2 | 10/2024 | Andral | |
| 2005/0076198 | A1 * | 4/2005 | Skomra | H04L 63/0823 713/156 |
| 2008/0172737 | A1 * | 7/2008 | Shen | G16H 10/60 726/21 |
| 2009/0254466 | A1 | 10/2009 | Karkanias et al. | |
| 2012/0179490 | A1 * | 7/2012 | Fuhrmann | G16H 10/60 705/3 |
| 2014/0219453 | A1 | 8/2014 | Neafsey et al. | |
| 2014/0223523 | A1 | 8/2014 | Neafsey et al. | |
| 2015/0089568 | A1 * | 3/2015 | Sprague | H04L 63/06 726/1 |
| 2016/0330178 | A1 * | 11/2016 | Sprague | H04L 63/0853 |
| 2017/0076405 | A1 * | 3/2017 | Shah | G06Q 50/01 |
| 2018/0211059 | A1 * | 7/2018 | Aunger | H04L 63/166 |
| 2019/0356641 | A1 | 11/2019 | Isaacson et al. | |
| 2020/0053081 | A1 | 2/2020 | Park et al. | |
| 2020/0082139 | A1 | 3/2020 | Peeters | |
| 2020/0168306 | A1 | 5/2020 | Chen et al. | |
| 2020/0226285 | A1 | 7/2020 | Bulleit et al. | |
| 2020/0244633 | A1 * | 7/2020 | Sprague | H04L 63/126 |
| 2020/0334229 | A1 | 10/2020 | Harrison et al. | |
| 2021/0044637 | A1 | 2/2021 | Lee et al. | |
| 2021/0174972 | A1 | 6/2021 | Pavlatos et al. | |
| 2021/0357893 | A1 | 11/2021 | Kang et al. | |
| 2021/0366586 | A1 | 11/2021 | Ryan et al. | |
| 2022/0035936 | A1 | 2/2022 | Lin | |
| 2022/0123950 | A1 | 4/2022 | Erickson et al. | |
| 2022/0150711 | A1 | 5/2022 | Lim et al. | |
| 2022/0158997 | A1 | 5/2022 | Guinard et al. | |
| 2022/0222364 | A1 | 7/2022 | Roberts et al. | |
| 2022/0310219 | A1 | 9/2022 | Sanchez, Jr. et al. | |
| 2022/0337611 | A1 * | 10/2022 | Brazao | G06Q 30/018 |
| 2022/0374875 | A1 | 11/2022 | Madisetti et al. | |
| 2023/0005613 | A1 | 1/2023 | Race et al. | |
| 2023/0108610 | A1 | 4/2023 | Tang et al. | |
| 2023/0118312 | A1 | 4/2023 | Sun | |
| 2023/0126016 | A1 | 4/2023 | Nelson | |
| 2023/0130347 | A1 | 4/2023 | Ravinathan | |
| 2023/0207082 | A1 | 6/2023 | Schneider et al. | |
| 2023/0354020 | A1 | 11/2023 | Rule et al. | |
| 2023/0403144 | A1 | 12/2023 | Rhodin | |
| 2023/0421399 | A1 | 12/2023 | Quirk et al. | |
| 2024/0037539 | A1 | 2/2024 | Nonni et al. | |
| 2024/0061951 | A1 | 2/2024 | Innanje et al. | |
| 2024/0126919 | A1 | 4/2024 | Ankrom et al. | |
| 2024/0161889 | A1 | 5/2024 | Ferenczi et al. | |
| 2024/0220939 | A1 | 7/2024 | Ropel et al. | |
| 2024/0221439 | A1 | 7/2024 | Ropel et al. | |
| 2024/0275770 | A1 | 8/2024 | Agrawal et al. | |
| 2024/0354866 | A1 | 10/2024 | Schwartz | |
| 2024/0378683 | A1 | 11/2024 | Gorski et al. | |
| 2024/0382493 | A1 | 11/2024 | Ankrom et al. | |
| 2025/0131994 | A1 | 4/2025 | Gross et al. | |
| 2025/0131997 | A1 | 4/2025 | Forester et al. | |
| 2025/0291948 | A1 | 9/2025 | Gnanasambandam et al. | |

OTHER PUBLICATIONS

International Search Report and Written Opinion for International Application No. PCT/US2024/021434 dated Jun. 24, 2024.
International Search Report and Written Opinion for International Application No. PCT/US2024/021435 dated Jun. 24, 2024.
International Search Report and Written Opinion for International Application No. PCT/US2024/021921 dated Jul. 1, 2024.
International Search Report and Written Opinion for International Application No. PCT/US2023/032871 dated Dec. 4, 2024.

* cited by examiner

ACCESS MANAGER THAT LIMITS ACCESS TO USER INFORMATION USING AUTHENTICATION AND VERIFICATION

FIELD

The embodiments of the present disclosure generally relate to secure storage system(s) that permit scope limited access to a user's secure information using credential authentication and user information verification.

BACKGROUND

The proliferation of computing and connected devices has generated vast amounts of data that requires management. As data grows in size, the technological challenges related to efficiently managing the data has become increasingly complex. For example, sharing secure data among multiple parties has been a longstanding problem in the field of data management. Security techniques that permit a user to manage secure information, such as authentication, validation, and explicit permission workflows, can be cumbersome and, in some scenarios, impractical. Security protocols that achieve practical secure data sharing in scenarios that cause friction for traditional data sharing protocols can provide substantial value.

SUMMARY

The embodiments of the present disclosure are generally directed to systems and methods for permitting limited access to a user's secure information using credential authentication and user information verification. A request to access a user's secure information can be received at a secure information manager from a computing system of a vetted entity, the request comprising identifying information of the user and one or more credentials issued to the vetted entity. It can be validated that the identifying information of the user matches a preregistered person at the secure information manager, where the identifying information of the user comprises one or more of: user information obtained via scanning of a personalized portable access point of the user, biometric information sensed from the user's person, a representation of an identifying document that comprises an image of the user, an image of the user's face or the user's eyes, or any combination thereof. The one or more credentials and the vetted entity can be authenticated, where the authenticated one or more credentials permit the vetted entity scope limited access to the user's secure information for a limited duration of time. In response to the validating and authenticating, the computing system associated with the vetted entity can be permitted the scope limited access to the user's secure information for the limited duration of time.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
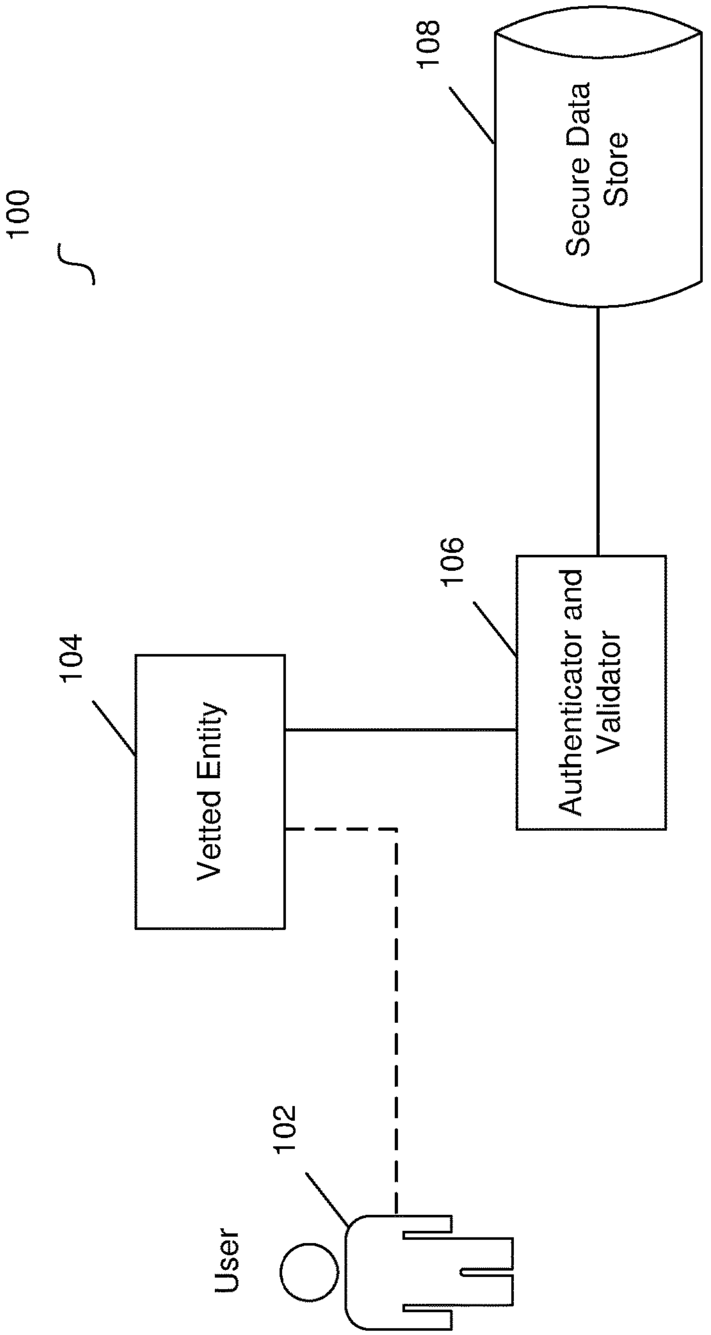
FIG. 1 illustrates a system for permitting limited access to a user's secure information using credential authentication and user verification according to an example embodiment.

Embodiments permit scope limited access to a user's secure information using credential authentication and user information verification. Certain information sharing protocols can require an explicit grant to share a user's secure information with a requesting computing system and/or entity. However, in some scenarios such an explicit grant may be impractical and/or impossible, such as when the user has lost consciousness or capacity to provide such an explicit grant. Embodiments of a secure information manager can permit a vetted entity scope limited access to a user's secure information in such scenarios, for example when the vetted entity provides an assertion that the user is unable to provide an explicit grant. For example, in emergency scenarios or any other suitable scenario with exigent circumstances, the secure information manager can permit the vetted entity access to a limited scope of user information that corresponds to the vetted entity's relationship to the user, role in a workflow, or other suitable characteristics of the vetted entity.

The vetted entity can undergo a vetting workflow that permits the entity such scenario specific access. For example, the vetted entity can be an individual, organization, group of individuals, and the like, and the vetting workflow can include one or more of: identity verification, credential verification (e.g., government credentials, medical credential, financial advisor credentials, etc.), cyber security validation, and any other suitable vetting. In some implementations, a computing system associated with the vetted entity can transmit a request to a secure information manager for the user's secure information, for example when an urgent scenario is encountered and the user is unable to explicitly grant the access.

In some implementations, the request includes: one or more entity credentials; identifying information for the user; and/or assertions related to the user and/or scenario. The entity credential(s) can include credentials issued to the entity (e.g., issued to one or more users and/or identities associated with the entity) after the entity is vetted by the vetting workflow. Example entity credential(s) include a blockchain backed non-fungible token (NFT), an access token (e.g., Security Assertion Markup Language (SAML), Open Authorization (OAuth), etc.), one or more cryptographic keys or signatures, and the like. In some implementations, the secure information manager can authenticate the entity credentials provided in a request prior to permitting access to secure user information.

In some implementations, identifying information for the user included in a request can include one or more of: a set of user data that identifies the user (e.g., full name, birthdate, home city, state, and/or zip code, physical appearance, etc.), an image of a government issued document that identifies the user (e.g., driver's license, passport, etc.), biometric information (e.g., fingerprints, eye scan, DNA information, etc.), and other suitable identifying information for the user. For example, the request can be transmitted from a computing system associated with the vetted entity, and the user identifying information can be obtained from the user's person, the user's photo identification, the user's wireless device, a wireless device of another individual associated with the user, and the like.

In some implementations, scanning elements(s) of the computing system associated with the vetted entity can obtain biometric information from the user's person, such as by scanning the user's fingerprint(s) via a finger printer reader or any suitable scanning device, scanning the user's retina(s) via an eye scanner or any suitable eye scanning device, and the like. In some implementations, the scanning elements(s) of the computing system associated with the vetted entity can scan other suitable identifying information for the user, such as the user's driver's license or other suitable photo identification, one or more visual depictions from the user's wireless device (e.g., user specific portable access point for the user's information) or a wireless device of an additional user that comprises a predefined relationship with the user, and the like.

For example, the user's wireless device (e.g., a managing application executing at the wireless device) can display a portable access point specific to the user that comprises a visual code, such as a QR code, alphanumeric code, or any other suitable code. In some implementations, the code can be embedded within an image of the user. One or more scanning element(s) of the vetted entity's computing system (s) can scan the portable access point and to obtain the identifying user information for the request.

In some implementations, the vetted entity can comprise any suitable entity that performs services for the user, such as home services (e.g., home constructure, repair, etc.), automobile services (e.g., repairing the user's care), medical services (e.g., medical services relates to a doctor's office, hospital, emergency room, first responders, etc.), financial services (e.g., accounting, trustee services, financial advising, etc.), technology services (e.g., system administrator services, web hosting, etc.), and the like. In this example, after performance the vetting workflow(s) the relationship between the vetted entity and the user is predefined at the secure information manager. Accordingly, the user's secure information can be scoped so that, in response to the request, the vetted entity is only provided information that corresponds to the vetted entity's relationship with the user; and is relevant to an emergency scenario.

For example, a vetted entity that is a technology service provider may be scoped for certain network information, cybersecurity information, cryptographic key information, etc. so that the technology service provider can access systems related to the user and perform any urgent upgrades and/or patches. In another example, a vetted entity that is a hospital, emergency room entity, and/or first responder may be scoped for certain data points in a user's electronic health record, such as blood type, medication list, allergies, preexisting health conditions, latest diagnostic test results (e.g., blood pressure, blood sugar, cholesterol, etc.), or other suitable user health information pertinent to an emergency scenario.

In some implementations, the secure information manager may grant the scope limited access to the user's information for a limited duration of time. For example, in an emergency scenario it may be urgent to provide some of a user's information to a vetted entity, such as before a user can explicitly grant the access, however after a period of time the user may become available to provide this grant. Accordingly, implementations can withdraw the access to the user's secure information after a period of time when no explicit consent that grants continued access to the user's secure information is received from the user.

In some implementations, the vetted entity is provided scope limited access to the user's secure information that corresponds to one or more accreditations, registrations, or other suitable public credentials. For example, a technology system administrator may possess accreditations from one or more accreditation organizations, and the vetted entity may be permitted scope limited access that corresponds to the accreditation(s) when the accreditation(s) are active and in good standing. In another example, emergency room personnel and/or first responders may be accredited by various accreditation boards and/or organizations, and the vetted entity may be permitted scope limited access that corresponds to the accreditation(s) (e.g., health record data points relevant to an emergency room visit or first responder scenario) when the accreditation(s) are active and in good standing.

In some implementations, the request from the vetted entity to access the user's secure information also includes one or more assertions related to the user or scenario. An example assertion is that the user is incapacitated, unconscious, or otherwise unavailable to provide an explicit access grant. In some implementations, the assertion provides a descriptor and/or category for the emergency scenario. In an example where the vetted entity is a system administrator, the descriptor/category can include a website being down, a managed software application being down, a cybersecurity breach, or other suitable descriptor or category.

In some implementations, one or more predefined categories can correspond to different scope(s) of access to the user's secure information. In an example where the vetted entity includes emergency room personnel and/or first responders, a category for a health event can be included in the request. Predefined categories for health events can include: unconscious without visible signs of trauma, gunshot wound, stab wound, vehicle accident, unconscious with signs of unspecified trauma, and the like. These different predefined categories can map to different data points of the user's electronic health record. For example, a first request from the vetted entity with an assertion that the user is unconscious can map to a first scope of the user's secure information (e.g., electronic health record), while a second request from the vetted entity with an assertion that the user is unconscious with signs of physical trauma can map to a second scope of the user's secure information, the second scope being different from the first scope.

The predetermined scope definitions can also be mapped to the role of the vetted entity with respect to the user. For example, where the vetted entity is a health care provider, the role of the vetted entity can comprise the type of health care provider (e.g., emergency room, paramedic, urgent care, etc.), the types of medical services rendered by the health care provider (e.g., surgery, non-surgical lifesaving care, etc.), or any other suitable role definition. For example, a first request from the vetted entity that comprises a first role can map to a first scope of the user's secure information (e.g., electronic health record), while a second request from the vetted entity that comprises a second role (different from the first role) can map to a second scope of the user's secure information, the second scope being different from the first scope. Similarly, the first request from the vetted entity that comprises the first role can map to a first time duration over which access to the user's secure information is permitted, while a second request from the vetted entity that comprises a second role (different from the first role) can map to a second time duration over which access to the user's secure information is permitted, the second time duration being different from the first time duration.

The user can define the predetermined scope and/or time duration mapped to a given role and, in some example, assign roles to one or more of the vetted entities. The user can generate/define roles and scope definitions/time durations for each role via an information management application (e.g., web application, native application, etc.), such as via the user's wireless device. Once a user defines a given role and corresponding scope definition/time duration for the role, the user can assign known vetted entities to the role. For example, known vetted entities can comprise healthcare providers that: the user has previously visited; are proximate to physical locations for the user, such as the user's home address and/or work address; the user explicitly selects via input at the information management application; and the like.

The user can assign any known vetted entity a role and a corresponding scope definition/time duration. An authenticated access request from a known vetted entity (e.g., comprising credential(s) and an assertion that the user is incapacitated) can permit the vetted entity access that corresponds to the scope definition defined for the known vetted entity's assigned role for the defined time duration. The user can also define a role and corresponding scope definition/time duration for unknown vetted entities, and access request(s) from unknown vetted entities (e.g., comprising credential(s) and assertion(s) that the user is incapacitated) can permit the vetted entities access that corresponds to the scope definition defined for an unknown vetted entity for the defined time duration.

In some implementations, the health care providers and/or vetted entity personnel can comply with standard procedures for accessing a user's secure information. The additional techniques described in this disclosure can augment, accompany, and/or improve upon these standard procedures, for example in scenarios where a) an incapacitated user is present, but the user has not been previously registered/entered as a patient at the health care provider; b) the health care provider requires an emergency access pathway to view the user's electronic health record; c) or any other suitable scenarios.

In some implementations, the scope limited access permitted to the vetted entity by the secure information manager can be logged for audit, for example audit by the user, accreditation organization(s) and/or board(s), or any other suitable authority. For example, the scope of the information accessed by the vetted entity can be logged, and the user can review which data points of secure information the vetted entity requested, which data points the secure information manager provided to the vetted entity, and timestamps for the information access. In some implementations, the vetted entity also provides one or more assertions with submitted request(s), and the assertion(s) can be logged in association with the scope of information requested/accessed. For example, if a user enters an emergency room in an incapacitated state, after the user is treated, recovers, and is discharged the user can audit the emergency access that the secure information manager granted the emergency room personnel.

In some implementations, the user can compare the assertion(s) submitted to the user's health condition and medical care. For example, if the user's medical treatment clearly indicated that the user did not experience any trauma, but the emergency room's information request included an assertion of "user incapacitated with signs of unspecified trauma", the user can report an inconsistency or take other suitable remedial action. In addition, the user can determine when consciousness was regained, and thus when the user regained the ability to provide an explicit grant for information access (e.g., when the emergency scenario no longer applied). In this example, the user can compare a timestamp of an emergency request for user information with a known timeline of the user's recovery and report any inconsistencies (e.g., a request with an assertion that the user is unconsciousness during a point in recovery where the user had regained consciousness).

In some implementations, the user can report such irregularities or inconsistencies to the secure information manager, which can reconsider the vetted status of the emergency room and/or emergency room personnel. In another example, the user can report such irregularities to accreditation organizations and/or boards for their consideration when accrediting the emergency room and/or emergency room personnel. In some implementations, the logged request(s), secure information access, and/or assertion(s) by a vetted entity can be maintained by a blockchain service.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for permitting scope limited access to a user's secure information according to an example embodiment. Diagram 100 includes user 102, vetted entity 104, authenticator and validator 106, and secure data store 108. In some implementations, vetted entity 104 can issue a request to authenticator and validator 106 for urgent access to user 102's secure information stored at secure data store 108. Vetted entity 104 can be any suitable person, group of people, organization or company, and the like that undergoes a vetting workflow.

In some implementations, vetted entity 104 comprises computing system(s) associated with the vetted entity. For example, an application at the computing system(s) can permit a registered identity of vetted entity 104 to login to the application. In some implementations, vetted entity 104 and one or more registered identities of the vetted entity can be registered with authenticator and validator 106. For example, authenticator and validator 106 can be part of a secure information manager that manages access to secure data store 108.

In some implementations, user 102 may be collocated (in the same physical location) as the computing system(s) of vetted entity 104. For example, the computing system(s) can obtain user information from user 102, such as biometric information, scanned versions of photo identification, and the like. In this example, user 102 may be incapacitated, and thus the user may not be able to explicitly grant a request to permit vetted entity 104 access to the user's secure information. In other examples, user 102 and the computing systems of vetted entity 104 may be remote from one another.

The computing system(s) of vetted entity 104 can then issue a request to authenticator and validator 106 for access to the user's secure information stored at secure data store 108. For example, the request can include credentials issued to the vetted entity (e.g., NFT(s), access token(s), cryptographic signature(s), and the like), identifying information for user 102 (e.g., obtained from the user, stored at a database of the vetted entity, scanned version of the user's photo identification, etc.), and assertion(s) descriptive of the user's status (e.g., an assertion that the user is unavailable to provide an explicit grant of access).

Authenticator and validator 106 can authenticate the credential(s) included in the request and validate the user's identifying information. For example, authenticator and validator 106 can authenticate that the request credential(s) correspond to one or more credentials issued to vetted entity 104. Authenticator and validator 106 can also validate that the user's identifying information corresponds to a registered person that has secure information stored at secure data store 108. For example, user 102 can register with a managed secure information service such that user 102's secure information is stored at secure data store 108. Based on the registration, validation information about user 102 can be stored by authenticator and validator 106, such as full name, birthdate, social security number, local address and/or zip code, medical information (e.g., primary care physician, etc.), biometric information (e.g., fingerprints, eye scan, etc.), vehicle make, model, and/or license plate, representations of government issued identification (e.g., driver's license photo), images of the user's face, and the like.

In some implementations, secure data store 108 can store the secure information for a number of registered persons (e.g., hundreds, thousands, hundreds of thousands, millions, etc.), and authenticator and validator 106 can store confirmation information for these registered persons. Authenticator and validator 106 can compare the user's identifying information contained in a request with the confirmation information for these registered persons to locate a match.

When the user's identifying information provided in the request matches a managed person's validation information, authenticator and validator 106 can validate that the request corresponds to an identified person for which secure information is stored at secure data store 108. In some implementations, authenticator and validator 106 can generate a confidence score for the match. For example, the request can comprise the user's full name, birthdate, and a geographic location from which the request originated. In this example, authenticator and validator 106 can match the user's full name and birthdate to a registered person, however the zip code from which the request originated may not match the local zip code for the registered person. Such a match may generate a confidence score that does not meet the criteria for validation.

In some implementations, a confidence score for a match can be based on both the quantity of information and quality of information from the request that matches a managed person's validation information. For example, in the presence of a mismatched zip code, a matching full name, birthdate, and additional piece of information (e.g., biometric information, photo identification, etc.) can generate a confidence score that meets the validation criteria and permits scope limited access to the registered person's secure information.

In some implementations, vetted entity 104 can comprise a hospital, an emergency room, first responder group, urgent care facility, or any other suitable medical service entity that provides urgent medical care. In this example, user 102 may be unconscious and the request to access secure information can relate to providing urgent medical care to user 102. Because secure information for user 102 sought by vetted entity 104 is consequential to user 102's health, implementations of authenticator and validator 106 are configured to provide quick and reliable matches between the user information in a request and the data set of validation information stored for registered persons.

In some implementations, authenticator and validator 106 can scope the data set of validation information stored for registered persons using portions of the received request when searching for a match. For example, the data set of validation information can be initially scope using a location parameter (e.g., group of co-located zip codes, cities, etc.) for the request, and the scoped data set can be searched for a match of other parameters (e.g., full name and birthdate). In this example, registered persons can provide a location parameters (e.g., within 50 miles of a zip code) on which the data set of validation information can be scoped. In some implementations, the location from the request can include the location from which the request originated, a location for user 102 (e.g., address and/or zip code from the user's driver's license), or any other suitable location. The data set of validation information stored for registered persons can be initially scoped using any other suitable parameter(s) that correspond to the request.

In some implementations, multiple potential matches may be found based on the user's identifying information provided in a request. For example, the request may include a zip code, the user's full name, and one or more facial image(s) of the user. Multiple registered persons may match the user's full name and the zip code for the request. In such scenarios, the user's facial image(s) from the request can be used to select against the multiple registered persons.

For example, the facial image(s) of the user can be compared to facial image(s) of the potential matches (the facial images(s) being part of the data set of validation information for the registered persons). The comparison can be performed by computer vision model(s), such as convolutional neural network(s) configured and trained to compare facial image(s) and output a confidence score for a match. When a matching facial image is found that meets a confidence score criteria, authenticator and validator 106 can validate that the user's identifying information matches the validation information for this registered person.

In some implementations, authenticator and validator 106 can include a master patient index that aggregates data from a number of sources (e.g., electronic health records, hospital systems, doctor's offices, etc.). For example, the data set of validation information for registered persons can include data aggregated using one or more master patient indexes. In some implementations, each registered person can provide authenticator and validator 106 permission to aggregate the user's information from these sources. The data for the data set of validation information can be aggregated from any other suitable sources (e.g., state department of motor vehicle(s), other government entities, public records, etc.).

In some implementations, once authenticator and validator 106 authenticates the credential(s) of the request and validates that the user's identifying information matches a managed person's validation information, authenticator and validator 106 can permit vetted entity 104 scope and time limited access to the user's secure information stored at secure data store 108. For example, the scope of the user's secure information can be limited to a relationship between vetted entity 104 and user 102, or other suitable characteristics of vetted entity 104. In another example, the access can be limited to a duration of time (e.g., 12 hours, 24 hours, etc.), after authenticator and validator 106 will no longer permit vetted entity 104 access unless another request is issued that authenticates and validates.

Figure 2:
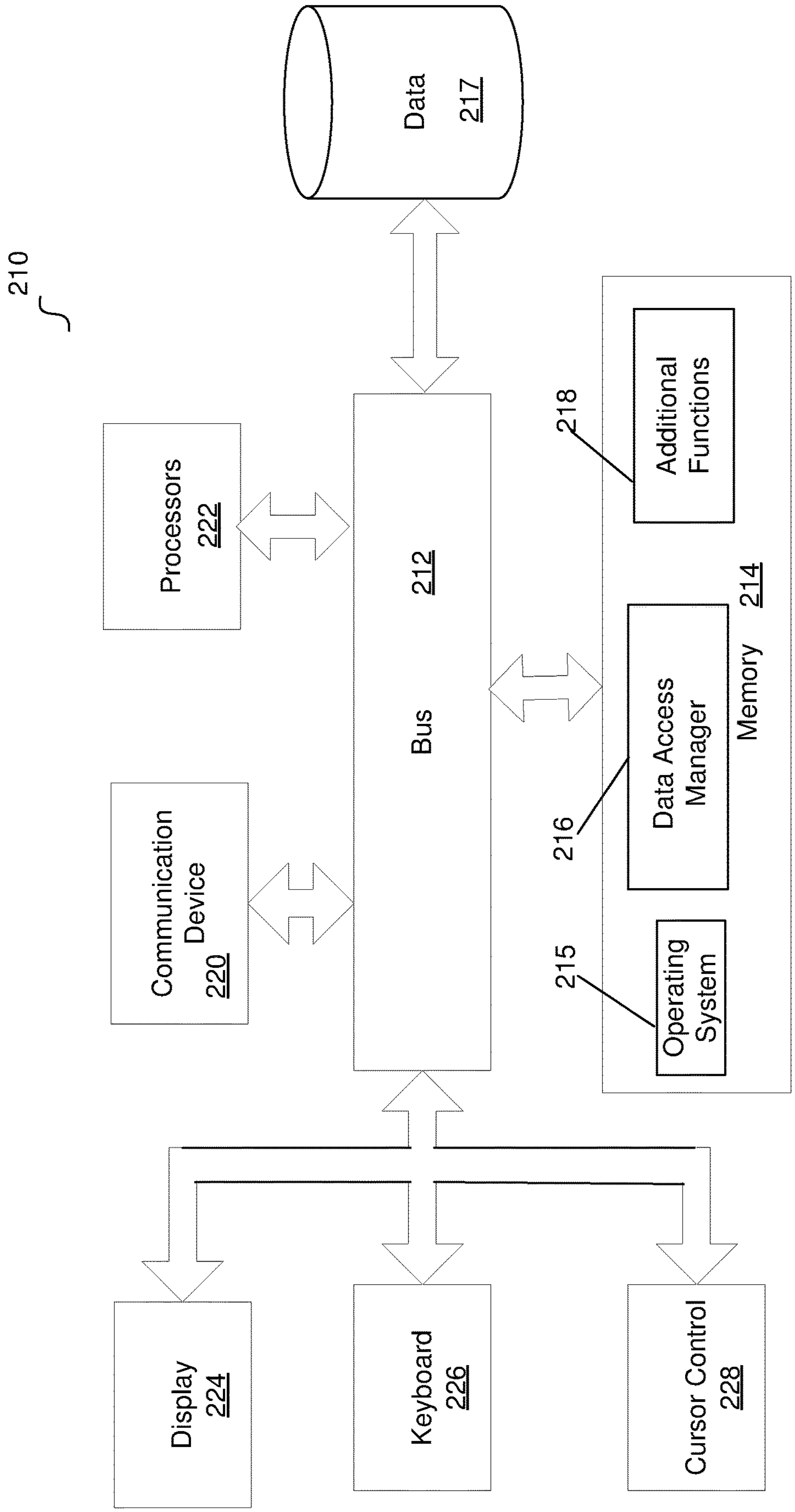
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, migration prediction component 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, data access manager 216, as well as other applications modules 218. Operating system 215 provides operating system functionality for system 210. Data access manager 216 may provide system functionality for permitting scope limited access to a user's secure information to a vetted entity, or may further provide any other functionality of this disclosure. In some instances, data access manager 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of Oracle® Data Integrator, Oracle® Cloud Infrastructure, Oracle® Autonomous Database, Oracle® Cerner®, Oracle® Cerner® Millennium, Oracle® Cerner® HealtheIntent, Oracle® Cerner® Seamless Exchange, Oracle® Cerner® HealtheCare, and representative products across the Oracle® Health & Artificial Intelligence platform for example. A database 217 is coupled to bus 212 to provide centralized storage for modules 216 and 218 and to store, for example, registered person validation information, vetted entity information, authentication and validation related information, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3A:
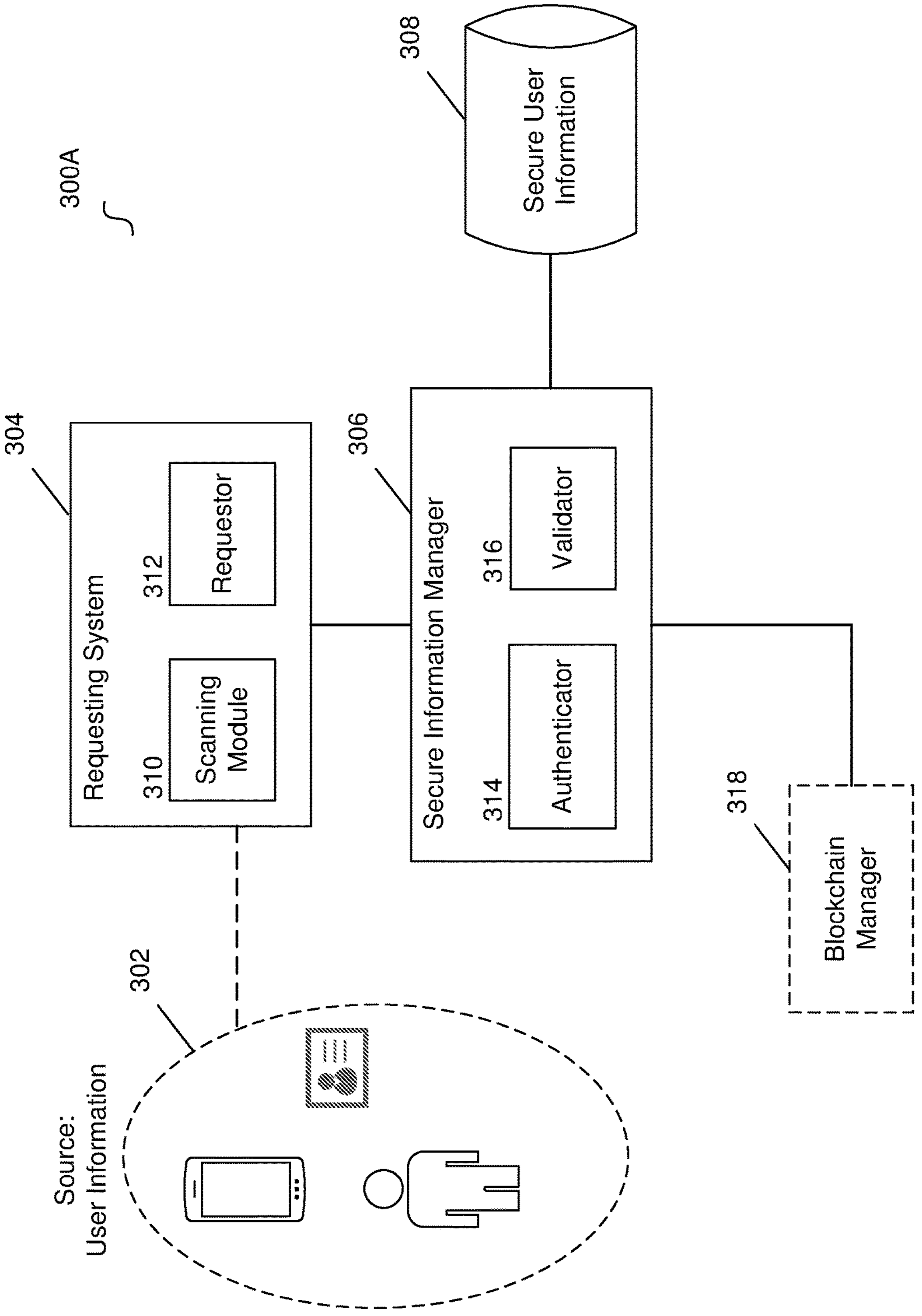
FIGS. 3A and 3B illustrate systems with a secure information manager that permits scope limited access to secure user information according to an example embodiment.
Figure 3B:
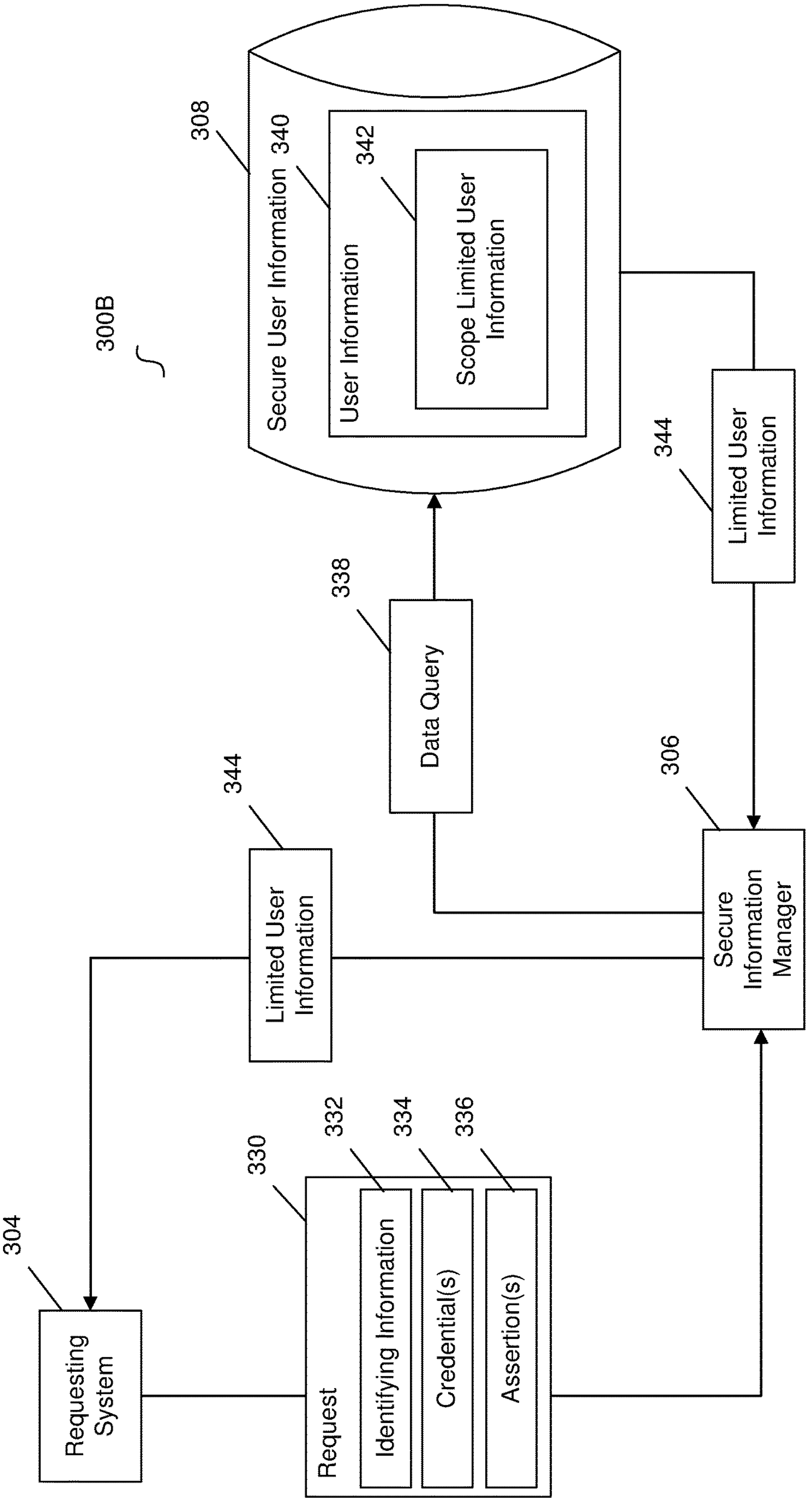

FIGS. 3A and 3B illustrate systems with a secure information manager that permits scope limited access to secure user information according to an example embodiment. Diagram 300A includes source information 302, requesting system 304, secure information manager 306, secure user information 308, scanning module 310, requestor 312, authenticator 314, validator 316, and blockchain manager 318. Implementations of requesting system 304 can be a system of a vetted entity, such as an entity that performed a vetting workflow by secure information manager 306. Source 302 can include sources of user information, such as the user's body, user identification documents (e.g., driver's license, passport, etc.), the user's wireless device (e.g., smartphone), and other suitable source(s) of user information.

Requesting system 304 can obtain user information from source 302. For example, scanning module 310 of requesting system 304 can scan biometric information from the user's body, such as fingerprint scans, eye scans, and the like. In another example, scanning module 310 can scan user identification documents, such as the user's driver's license, passport, and the like.

In some implementations, scanning module 310 can scan a display of the user's wireless device, such as a visual code display via an application executing at the user's wireless device. In some implementations, the visual code can be a portable access point for the user's secure information. For example, the user's wireless device (e.g., an application executing at the wireless device) can display a portable access point specific to the user that comprises a visual code, such as a QR code, alphanumeric code, or any other suitable code. In some implementations, the code can be embedded within an image of the user. Scanning module 310 can be a specialized device configured to scan the portable access point and obtain the identifying user information for the request, such as a wireless device that comprises an image capturing component (e.g., camera) and that executes an application that can decipher the portable access point. In some implementations, the visual potable access point can be displayed by the user's wireless device on the lock screen (e.g., prior to inputting a password), in the wireless device's background, as a stored image in the wireless device's photo library, or via any other suitable display means.

In some implementations, the user's wireless device may permit limited access to secondary individuals (e.g., persons with restricted access rights to the user's wireless device, etc.), in an emergency scenario, such as using facial recognition, biometric data, and/or a login/password that corresponds to limited access rights. The limited access can permit the secondary individuals access to a user interface that displays the user's visual portable access point, an application that permits sharing user identifying information via wireless communication, and the like.

In some implementations, scanning module 310 can receive identifying information for a user via an application executing on the user's wireless device that transmits such information via near field communication, Bluetooth communication, or any other suitable wireless communication. For example, any suitable identifying information stored at the user's wireless device can be transmitted/received, such as full name, birthdate, user images, portable access points image and/or information, a user identifier for one or more electronic health records (e.g., identifier for a master patient index, identifier that is inter-operable with multiple electronic health record systems, etc.), and the like.

The user's wireless device can provide the user identifying information for the user (e.g., display the visual code, transmit the identifying information via wireless communication, etc.) while the wireless device is offline, such as while the wireless device lacks a connection to: the Internet, a cellular network and/or wireless local area network, or any other suitable network connection. In this example, components of a managing application that runs locally at the wireless device can provide the user identifying information. For example, once scanning module 310 receives/obtains the user identifying information from the user's wireless device, requesting system 304 can leverage a network connection to communicate with secure information manager 306.

In some implementations, source 302 can include a wireless device of a person that comprises a predefined relationship with the user. For example, the user can be a registered person for whom secure information manager 306 manages secure user information 308. The user can also register predefined relationship(s) with secure information manager 306, such as personal relationships (e.g., parents, spouse, children, friends, etc.), professional relationships (e.g., co-manager of an enterprise application, etc.), or other suitable relationships.

In some implementations, the person(s) that comprise predefined relationships with the user can possess wireless device(s) that can provide requesting system 304 identifying information for the user. For example, any suitable user identifying information provided by the user's wireless device can be transmitted to scanning module 310 via the wireless device of a person comprising a predefined relationship with the user. In some implementations, the related person(s) wireless device(s) comprise an application that is registered with secure information manager 306 and that provides the user identifying information.

Requestor 312 can transmit a request to secure information manager 306 for access to secure user information 308. Diagram 300B and request 330 further describes a request transmitted by requestor 312 to secure information manager 306. For example, the transmitted request can include one or more credentials issued to the vetted entity associated with requesting system 304, user identifying information (e.g., obtained via source 302 and scanning module 310), and one or more assertion(s) relative to the user.

In some implementations, secure information manager 306 can validate credential(s) included in the request and validate user identifying information included in the request. For example, authenticator 314 can authenticate the provided credentials against the vetted entity and the credentials issued to the vetted entity. Validator 316 can validate that the user identifying information provided in the request corresponds to secure user information 308 (e.g., a person that is registered with secure information manager 306 such that the person's secure information is part of secure user information 308).

Blockchain manager 318 can manage one or more blockchain(s) for secure information manager 306. For example, credential(s) issued to vetted entities can include non-fungible token(s) or other suitable credentials managed by blockchain manager 318. In another example, logged data related to information accessed from secure user information 308 can be stored at one or more blockchain(s) managed by blockchain manager 318, such as for auditing functionality.

A blockchain is a list of records, each called a block, which can be linked through cryptography. In some blockchain implementations, each block includes a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains can be difficult to modify because data, once added to the blockchain, cannot be altered without altering subsequent blocks.

Non-Fungible Tokens (NFTs) are blockchain-backed identifiers specifying a unique item. Through a distributed ledger (e.g., blockchain), the assignment or ownership of these tokens can be tracked and verified. Such tokens can include an identifier of the unique item and/or link to a representation of the unique item (e.g., via a traditional URL or a distributed file system such as IPFS).

A blockchain managed by blockchain manager 318 can include one or more blockchain data structure(s) and smart contracts that execute in combination with the blockchain data structure(s). For example, blockchain manager 318 can record data that logs the request(s) and access of user secure information 308 by vetted entities. In another example, blockchain manager 318 can manage credential(s) issued to vetted entities, such as NFTs that correspond to access levels to user's secure information 308. In some implementations, the credential(s) managed by blockchain manager 318 can include access tokens (e.g., Security Assertion Markup Language (SAML), Open Authorization (OAuth), etc.), one or more cryptographic keys or signatures, and the like.

Diagram 300B includes requesting system 304, secure information manager 306, secure user information 308, request 330, identifying information 332, credential(s) 334, assertion(s) 336, data query 338, user information 340, scope limited user information 342, and limited user information 344. Similar to diagram 300A, implementations of requesting system 304 can be a system of a vetted entity, such as an entity that performed a vetting workflow by secure information manager 306.

In some implementations, requesting system 304 can interact with a user to generate request 330, such as scan portions of the user's body, scan identifying documents of the user, communicate with the user's wireless device, and the like. Request 330, issued to secure information manager 306, can include user identifying information 332, credential (s) 334, and assertion(s) 336.

User identifying information can include full name, birthdate, social security number, local address and/or zip code, medical information (e.g., primary care physician, etc.), biometric information (e.g., fingerprints, eye scan, etc.), vehicle make, model, and/or license plate, representations of government issued identification (e.g., driver's license photo), images of the user's face, and the like. Credential(s) 334 can include a blockchain backed non-fungible token (NFT), an access token (e.g., Security Assertion Markup Language (SAML), Open Authorization (OAuth), etc.), one or more cryptographic keys or signatures, and the like.

Assertion(s) 336 can be asserted statement(s) from the vetted entity that are related to the user and/or scenario. An example assertion is that the user is incapacitated, unconscious, or otherwise unavailable to provide an explicit grant of access to the user's secure information. In some implementations, the assertion provides a descriptor and/or category for an emergency scenario.

In some implementations, one or more predefined categories can correspond to different scope(s) of access to the user's secure information. In an example where the vetted entity includes emergency room personnel and/or first responders, a category for a health event can be included in the request. Predefined categories for health events can include: unconscious without visible signs of trauma, gunshot wound, stab wound, vehicle accident, unconscious with signs of unspecified trauma, and the like. These different predefined categories can map to different data points of the user's electronic health record. For example, a first request from the vetted entity with an assertion that the user is unconscious can map to a first scope of the user's secure information (e.g., electronic health record), while a second request from the vetted entity with an assertion that the user is unconscious with signs of physical trauma can map to a second scope of the user's secure information, the second scope being different from the first scope Secure user information manager 306 can authenticate credential(s) 334 and validate identifying information 332. For example, secure user information manager 306 can authenticate that credential(s) 334 are the credential(s) issued to the vetted entity associated with requesting system 304. Examples of credential(s) 334 include access tokens, cryptographic keys or other suitable cryptographic data (e.g., digital signatures, etc.), NFTs, or any other suitable credential managed by a blockchain. Secure user information manager 306 can also validate that identifying information 332 corresponds to a registered person whose secure information is stored as part of secure user information 308.

In some implementations, secure user information 308 can include secure information for a number of registered persons. User information 340 can represent the secure information stored for the user who is validated against identifying information 332. In some implementations, user information 340 can comprise a set of data points for the user and scope limited user information 342 can comprise a subset of the data points. In an example where secure user information 308 comprises electronic health records and user health data, the set of data points of user information 340 can include an aggregate of electronic health record data for the user, and the subset of datapoints of scope limited user information 342 can include metadata and/or summary data that covers components of the aggregated electronic health record data.

For example, scope limited user information 342 can be predefined health data points designated by the user as accessible in an urgent scenario or by any suitable vetted entity that comprises authenticated credential(s). In another example, scope limited user information 342 can include health data points based on a predefined template, such as data points tailored for emergency room personnel and/or first responders. Example scope limited user information 342 includes user blood type, preexisting health conditions, previous surgeries, allergies, current medications, or any other suitable user health data. In some implementations, user information 340 can be a segmented health record, and the data points comprised by scope limited user information 342 can be any suitable segments of the segmented health record.

In some implementations, user information 340 can be electronic health data segmented based on parameters. For example, the parameters can include: originating or attributed physician and/or medical organization (e.g., entity names or identifier(s)), type of information (e.g., medications, tests and results, medical history, family history, biometrics, physician and patient communications, physician notes, vaccine information, allergies, etc.), relevant health practice (e.g., cardiology, primary care, neurology, oncology, etc.), date of information origination, electronic health record format, other Health Level Seven (HL7), Fast Healthcare Interoperability Resource (FHIR), and/or Substitute Medial Applications and Reusable Technologies (SMART) on FH IR data parameters, or any other suitable health data parameters. Scope limited user information 342 can comprise user defined portions of user information 340 (e.g., defined using parameters and/or parameter values) and/or predefined portions of user information 340 (e.g., customized templates) configured to provide health data that is sufficient for emergency scenarios.

In some implementations, in response to an authenticated and validated request, secure information manager 306 can issue data query 338 to secure user information 308. In response, secure information manager 306 can receive limited user information 344, which can be scope limited based on the vetted entity, the relationship between the vetted entity and the user, the assertion(s) included in the request, or any other suitable parameter. Secure user information 344 can then be provided to requesting system 304.

In some implementations, the vetted entity can include one or more registered identities. For example, the vetted entity can be an organization and the registered identities can be persons that are part of the organization. In some implementations, the vetted entity is a hospital, emergency room organization, or a first responder organization, and the registered identities are emergency room personnel and/or paramedics.

In some implementations, request 330 may be issued by the registered identity of the vetted entity. For example, request 330 can comprise an indicator of the vetted entity and registered identity, such as credential(s) 334 that, when authenticated, identify the registered identity and vetted entity. Any other suitable indicator can be included in request 330.

Limited user information 344 can be scoped to the registered identity associated with the vetted entity that issued the request, and/or credential(s) 334 of the vetted entity or registered identity. For example, a paramedic registered identity may not perform certain surgeries that emergency room personnel can perform.

Accordingly, a request from a paramedic registered identity may correspond to a first version of limited user information 342 while a request from emergency room personnel may correspond to a second version of limited user information 342, where the first version is different from the second version. For example, the second version can include data points relevant to certain surgeries that are not included in the first version.

In some implementations, secure information manager 306 can access a schedule for the registered identity of the vetted entity, and scoped access to the user's information can be further limited to certain times during the registered identity's schedule. The schedule can be an "on-duty" schedule that defines when the registered identity is active in a particular capacity, such as active in a role that corresponds to the vetted entity. For example, the vetted entity can be a hospital and the registered identity can be an emergency responder that is part of the emergency response service of the hospital. The schedule accessible by secure information manager 306 can include the times when the registered identity is actively working as an emergency responder.

In some implementations, secure information manager 306 can be communicatively linked to requesting system 304 to determine whether a registered identity of the vetted entity is "logged-in" and "active" relative to requesting system 304. For example, an emergency responder may login to an emergency service provider's computing systems (e.g., requesting system 304), such as during the start of a work shift, by: entering a username and password in an application running on a mobile device or other computing device; scanning a badge at a scanning device linked to the emergency service provider's systems; scanning a token or device (e.g., radio frequency ID token, wireless device scanned via near-field-communication, etc.) at a scanning device linked to the emergency service provider's systems; or any combination thereof. In this example, secure information manager 306 may permit scope limited access to a user's secure information in response to a request from a registered entity associated with a vetted entity when the registered identity is "active" and/or "logged-in" relative to requesting system 304.

In some implementations, a vetted entity can be granted access to an incapacitated user's secure information via designated secondary contact(s) (e.g., emergency contacts). For example, the user, via a managing application that manages the user's secure information, can predefine person (s) as emergency contact(s) (e.g., predefine a relationship with the person that designates them to grant access to the user's secure information in emergency scenarios). These predefined relationships can include the user's name, contact information (e.g., phone number, email, etc.) and a relationship definition with respect to the user (e.g., spouse, friend, sibling, parent, child, etc.).

Once defined, the emergency contact(s) can receive indications that they have been identified by the user as an emergency contact, for example via a message to a phone number (e.g., text message, push message, etc.) or email. In some implementations, the emergency contact(s) can be prompted to perform a workflow to complete registration as the user's emergency contact. For example, the emergency contact(s) can be sent a link (e.g., to a phone number or email) that the person(s) can utilize to signup with the secure information manager, such as via a website, local application, web application, and the like. Once the emergency contact(s) have completed the workflow, the person(s) can be authorized to grant limited access to the user's secure information in an emergency scenario.

In some implementations, the user can define portion(s) of the user's secure information that correspond to each emergency contact. These defined portion(s) per emergency contact can be the portion(s) of the user's secure information that are accessible when the particular emergency contact grants access. For example, a spouse or family member may be permitted to grant access to most or all of the user's secure information while a friend or co-worker may be permitted to grant access to a limited amount of the user's secure information.

In response to receiving a request from a vetted entity to access a user's secure information in an emergency scenario (e.g., while the user is incapacitated), implementations of the secure information manager can contact the user's registered emergency contact(s) to obtain a grant. For example, the contact can be a message to the registered phone or email of the emergency contact(s), a message via an application loaded on a registered smartphone (e.g., a message that takes priority over the smartphone's display and includes a button that can be used to grant the access), a phone call, or any other suitable contact. When a specific emergency contact grants access, the vetted entity can be given access to the portion(s) of the user's secure information that corresponds with the specific emergency contact (e.g., portion(s) of the user's secure information defined for a grant from the specific emergency contact).

The one or more workflows to gain an access grant via a user's emergency contact(s) can be performed in combination with the functionality of FIGS. 3A and 3B. For example, a vetted entity can be given initial emergency access to a user's secure information, and a grant or denial from the user's emergency contact(s) can confirm the access, restrict the access, and/or withdraw the access. In some scenarios, the vetted entity may not be given access to the user's secure information until a grant from an emergency contact is obtained.

In some implementations, the user's identifying information received at embodiments of the secure information manager and/or a user profile for the user stored at the secure information manager can comprise an identifier in a master-patient index and/or a cross-platform identifier that links electronic health records across different record types, platforms, and/or electronic health record service providers. For example, the cross-platform identifier can link to an electronic health record for the user that is implemented by a third-party platform or that is otherwise external to the secure information manager. The secure information manager can retrieve the user's secure information using the cross-platform identifier to selectively permit access to vetted entities. In some implementations, the cross-platform identifier can be a portion of (e.g., prefix, suffix, etc.) a user identifier stored at the secure information manager for the user. Accordingly, the cross-platform identifier can be derived from an existing user identifier.

Implementations display a portable access point for a user that can be scanned by a vetted entity to obtain user identifying information. A portable access point can include an image, such as a facial image of the user, and encoded information. The encoded information can include a unique QR code or other suitable visual or symbolic (e.g., alphanumeric) code embedded relative to the image. In some implementations, the QR and/or symbolic code can leverage one or more of a holographic image, a raised holographic image, pixelated code, raised texturized code, and the like. For example, the encoded information can be displayed on top of the image as an embossed QR code, for example with a unique encrypted long string identifier that is produced using an algorithm.

In some implementations, encoded information can include a unique encrypted long string identifier generated via an encrypted long string identifier algorithm. The encrypted long string identifier can be unique at least due to the encrypted long string identifier algorithm that produced it. For example, if a fraudulent version of the portable access point attempted to replicate the unique encrypted long string identifier, the scanning of the image and encoded information would not match due to the unique algorithm that was used.

The unique encrypted long string identifier generated via an encrypted long string identifier algorithm can be dynamic such that a new identifier is generated for: each version of the portable access point, over a predefined period (e.g., every 2 hours, 4 hours, 6 hours, 12 hours, daily, etc.), or via any other suitable timing. In this example, a secure information manager that manages the user' secure information can receive the dynamically generated identifier for the version of the portable access point. For example, the identifier can be dynamically generated via an information management application loaded on the user's wireless device that manages the user's portable access point, and the application can transmit the dynamically generated identifier to the secure information manager. In another example, the identifier can be dynamically generated via a cloud service, and the cloud service can transmit the dynamically generated identifier to both the application that manages the user's portable access points and the secure information manager.

To mitigate against fraudulent attempts to access the user's secure information via an old version of the user's portable access point, the secure information manager can record the one or more active long string identifier(s) for a given user. When an access request that comprises an inactive identifier is received by the secure information manager, that request can be denied and the fraudulent attempt can be reported to support enhanced security measures.

A vetted entity system can be configured to scan the user's portable access point, such as scanning module 310 and requesting system 304 of FIG. 3A. Once scanning module 310 scans the portable access point, the requesting system 304 (e.g., an application configured to decipher the portable access point) can decipher the portable access point's encoded information and/or image. For example, the application at requesting system 304 can decipher the unique long string of numbers (e.g., generated by a unique algorithm), user identifying information, and other suitable deciphered data, and include the deciphered information in an access request sent to secure information manager 306. In some implementations, the user identifier obtained from the portable access point via the scanning can correspond to a user registered at secure information manager 306, and user identifying information stored at the secure information manager for the registered user can be retrieved using the identifier. In some implementations, user identifying information itself can be obtained from the portable access point via the scanning, and requesting system 304 can provide the obtained user identifying information to secure information manager 306 in an access request. Example user identifying information encoded by the portable access point can include one or more of: full name, birthdate, social security number, local address and/or zip code, medical information (e.g., primary care physician, etc.), representation of biometric information (e.g., fingerprints, eye scan, etc.), vehicle make, model, and/or license plate, representation of government issued identification (e.g., driver's license photo), representation pf images of the user's face, and the like.

Figure 4:
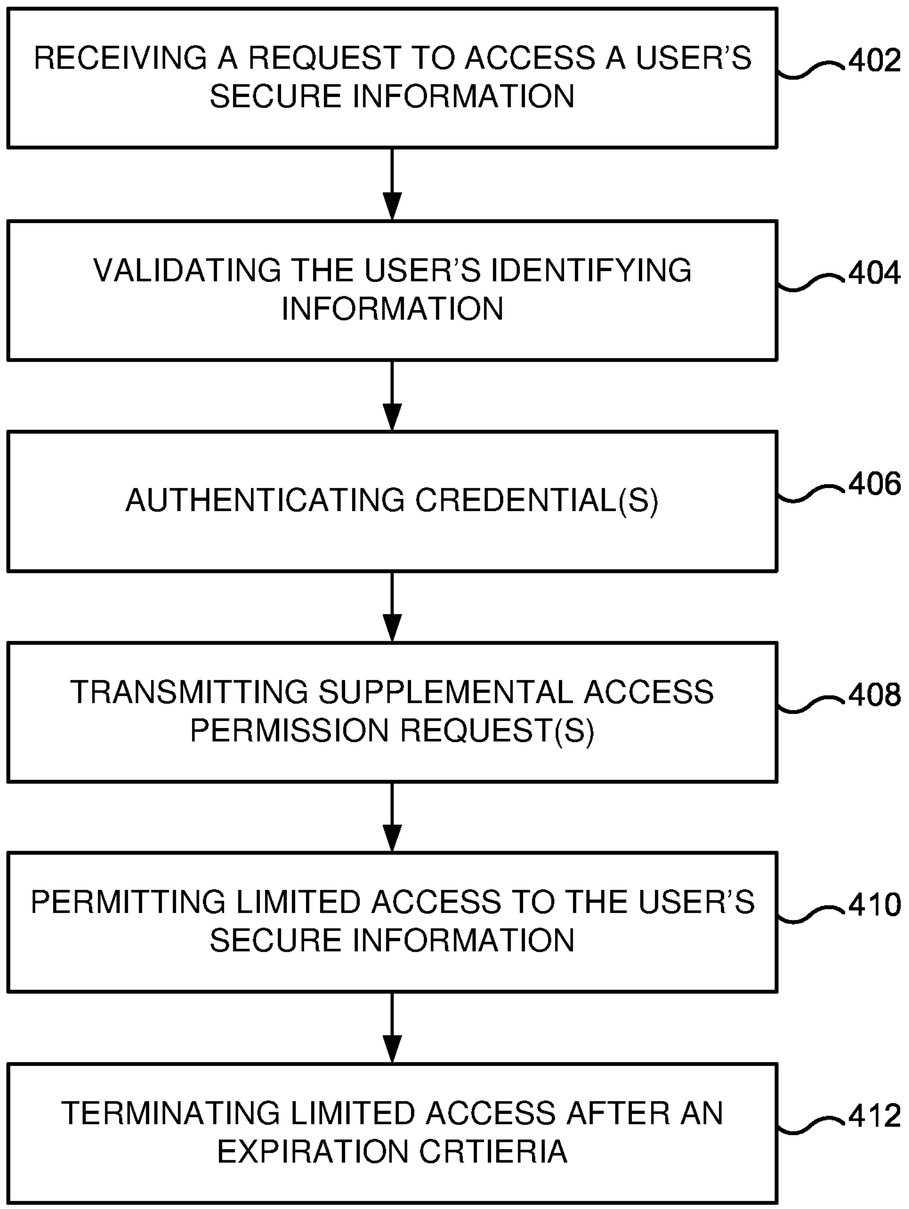
FIG. 4 illustrates a flow diagram for permitting limited access to a user's secure information using credential authentication and user verification according to an example embodiment.

FIG. 4 illustrates a flow diagram for permitting limited access to a user's secure information using credential authentication and user verification according to an example embodiment. In one embodiment, the functionality of FIG. 4 (and FIG. 5 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At block 402, process 400 can receive a request to access a user's secure information. For example, the request can be received at a secure information manager from a computing system of a vetted entity, and the request can include identifying information of the user and one or more credentials issued to the vetted entity. In some implementations, the request can also include assertion(s) from the vetted entity, such as assertions related to the user, a scenario (e.g., an emergency scenario related to the user), and the like.

At block 404, process 400 can validate the user's identifying information. For example, one or more persons can preregister to have their secure information managed at a secure data store. The validating can include matching the identifying information of the user from the request to a preregistered person at the secure information manager.

In some implementations, the identifying information of the user can be compared to validation information for the registered persons to determine a match. Example identifying information of the user from the request can include one or more of: user information obtained via scanning of a personalized portable access point of the user, biometric information sensed from the user's person (e.g., fingerprint, eye scan, etc.), a representation of an identifying document that comprises an image of the user (e.g., photo of driver's license), an image of the user's face or the user's eyes, or any combination thereof.

At block 406, process 400 can authenticate the credential (s) included in the request. For example, the one or more credentials can include a token issued to a vetted entity after performing a vetting workflow. The authenticating can confirm that the request came from an entity that underwent the vetting workflow. The token can comprise a non-fungible token, an access token, an electronic signature generated using a cryptographic key issued to the vetted entity, or any combination thereof. In some implementations, credential(s) can be managed by a blockchain service that can authenticate the credential(s). In some implementations, the authenticated one or more credentials permit the vetted entity scope limited access to the user's secure information for a limited duration of time.

At block 408, process 400 can transmit supplemental access permission requests to additional users that have a predefined relationship with the user. For example, the vetted entity's request can include one or more assertions that the user is unavailable to provide an explicit grant to access the user's secure information. As an additional safeguard to the user's secure information, an information guardian relationship can be predefined with one or more additional users. As information guardians, a supplemental access permission request can be transmitted to the wireless devices of the additional users to safeguard against improper access to the user's secure information.

In some implementations, the supplemental access permission request is transmitted to one or more wireless devices of the additional users, and an explicit grant of the supplemental access permission request is received from the one or more wireless devices. In some implementations, the supplemental access request is displayed to at least one of the additional users via at least one of the wireless devices as a priority notification that overrides a display of the wireless device. For example, an application with override permissions can be loaded on to the additional user's wireless device and, in response to receiving the supplemental access permission request, the application can override the wireless device's display with the supplemental access request. In some implementations, the override of the display can be maintained until input is received (from the additional user) that grants or denies the request.

In some implementations, the supplemental access request is displayed to at least one of the additional users via at least one of the wireless devices as an expiring notification with an expiration timer, and the at least one wireless device is configured to transmit an explicit grant of the supplemental access permission request in response to input prior to expiration of the expiration timer. For example, the supplemental access request can be an overly, panel, or other suitable display message that describes the purpose of the supplemental access request (e.g., permitting or denying access to the user's secure information) and includes one or more button for explicitly granting or denying the request. In some implementations, the request can display language descriptive of the relationship between the user and additional user, such as "you have been designated as a guardian of [[FULL NAME]] secure information."

At block 410, process 400 can permit, in response to the validating and authenticating, the computing system associated with the vetted entity scope limited access to the user's secure information for a limited duration of time. For example, the user's scope limited secure information can be provided to the computing system of the vetted entity that issued the request. In some implementations, the vetted entity's computing system is permitted the access for a limited duration of time (e.g., 1 hour, several hours, 1 day, 2 days, one week, etc.), after which the access expires. For example, further access can be permitted in response to an additional request (after authentication and validation of the additional request).

In some implementations, the computing system associated with the vetted entity can be permitted scope limited access to the user's secure information for a limited duration of time in response to the validating, the authenticating, and one or more responses to the supplemental access permission requests. For example, the computing system can be permitted access based on at least one response to the supplemental access permission requests. In some implementations, the computing system can be permitted access when no responses to the supplemental access permission requests are received. In some implementations, the computing system is denied access when at least one response to the supplemental access permission requests denies the access.

In some implementations, the access request comprises an assertion from the vetted entity that the user is incapacitated or unable to explicitly permit access to the user's secure information, and the scope limited access to the user's secure information is permitted in response to the assertion. In some implementations, the scope limited access to the user's secure information comprises access to scope limited data points of the user's secure information, the scope limited data points comprising a predefined correspondence to the assertion from the vetted entity. In some implementations, the vetted entity comprises a predefined role relative to the user, and the scope limited access to the user's secure information comprises access to scope limited data points of the user's secure information that correspond to the predefined role.

At block 412, process 400 can terminate the limited access after meeting an expiration criteria. In some implementations, the vetted entity's computing system is permitted the access for a limited duration of time, after which the access is terminated. In some implementation, access to the user's secure information can be controlled by the user's circumstances and the emergency scenario. For example, where the vetted entity is a hospital and the scenario is the user being incapacitated in an emergency room, the user's status as a patient at the emergency room can control the vetted entity's access to the user's secure information.

In some implementations, when the user is discharged from the hospital, the user's status in the vetted entity's computing systems can be updated (e.g., a Health Level 7 (HL7), Fast Healthcare Interoperability Resource (FHIR), and/or Substitute Medial Applications and Reusable Technologies (SMART) on FHIR code/status indicating discharge status can be updated). In some implementations, such an update to the user's status can trigger termination of the access by the vetted entity's computing system to the user's secure information via the request. In this scenario, the vetted entity can then reacquire access to the user's secure information through other channels, such as via an explicit access grant by the user now that the user is no longer incapacitated. In some implementations, the vetted entity's access to the user's secure information via the request can be maintained until the user's status indicates the user has been discharged. For example, a status update (e.g., HL7, FHIR, and/or SMART on FHIR status) may indicate the user's transfer to some other medical department and/or medical organization of the hospital, and the vetted entity's access to the user's secure information may persist when the user's status is a transfer rather than a discharge.

In some implementations, the wireless device associated with the user is issued an access request to explicitly grant access to the user's secure information by the vetted entity. However, because the user may be incapacitated or unavailable, the user may not respond to the request. The assertion (s) by the vetted entity can be relied upon to grant the vetted entity access to the user's secure information without an explicit grant by the user. In some implementations, a reply to the access request can be received from the user's wireless device that denies access and/or indicates that the user is not in an emergency scenario. This may occur if the user is misidentified by the vetted entity's computing systems and/or the secure information manager incorrectly validates the user. In this example, the access to the user's secure information may be denied and the vetted entity's computing system can be alerted that the user identified by the user identification information contained in the request is not in an emergency scenario. Such an indication may aid in correctly identifying a user in an emergency scenario.

In some implementations, process 400 can, in response to validating and authenticating, permit the computing system associated with the vetted entity scope limited access to the user's secure information for a limited duration of time (as described with reference to block 410) prior to receiving a response to the supplemental access permission requests transmitted to additional users that have a predefined relationship with the user (as described with reference to block 408). In this example, because the user's health may be at risk, the limited access can be permitted while waiting on responses to the supplemental access permission requests.

The user, via a response to the access request issued to the user (e.g., user's mobile device) and/or the additional users, via a response to the supplemental access requests issued to the additional users (e.g., additional users' mobile devices), can revoke the vetted entities access to the user's secure user information. For example, the user and/or the additional users can reply to the access request or supplemental access request with a DISALLOW response that terminates the vetted entity's access to the user's secure user information. In this example, the secure information manager can initiate a report to an authority with respect to the vetted entity's access request and assertion. For example, revoked access may indicate that the vetted entity fraudulently accessed the user's secure user information. The secure information manager can initiate a report to law enforcement and/or federal regulators that includes identifying information for the vetted entity (e.g., name, business address, etc.) and impacted user (e.g., full name, etc.).

Figure 5:
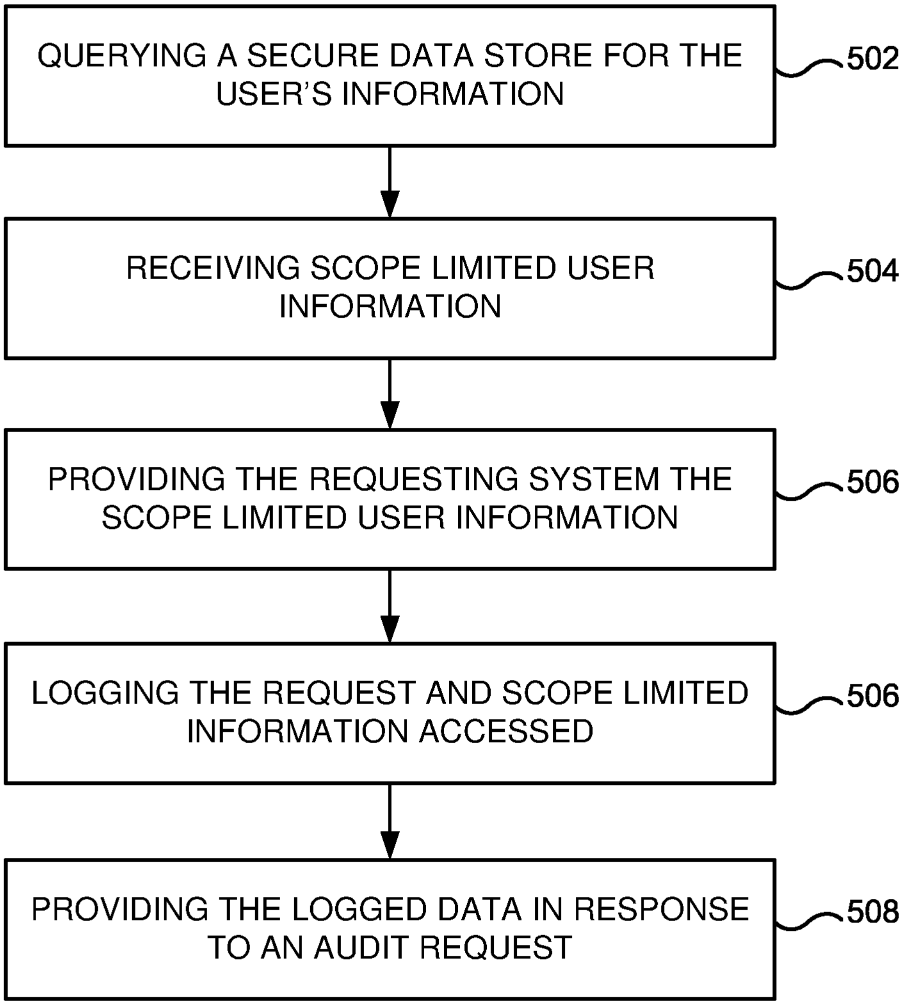
FIG. 5 illustrates a flow diagram for retrieving scope limited user information from a secure data store and logging the access according to an example embodiment.

FIG. 5 illustrates a flow diagram for retrieving scope limited user information from a secure data store and logging the access according to an example embodiment. In some implementations, process 500 can be performed by a secure information manager that has permitted a vetted entity access to a user's secure information, for example in response to a request from the vetted entity's computing system. In another example, process 500 can be performed by one or more components of a secure data store.

At block 502, process 500 can query a secure data store for the user's secure information. For example, a vetted entity can request a set of data points for a user's secure information. A data store query (e.g., SQL, any other suitable database query) can be generated that queries for all or a portion of the vetted entity's requested data points of the user's secure information.

At block 504, process 500 can receive scope limited user information from the secure data store. For example, the scope limited user information can be limited by the formulated data store query or by the data store itself. In some implementations, the generated query is limited to request a limited scope of the user's secure information that the vetted entity is permitted to access. In some implementations, the data store returns scope limited data points of the user's secure information that are limited to the data points that the vetted entity is permitted to access.

At block 506, process 500 can provide the scope limited user information to the requesting system of the vetted entity. For example, the returned scope limited data points of the user's secure information can be transmitted to the vetted entity's computing system that issued the request.

At block 508, process 500 can log the request(s), scope limited information accessed via the request(s), timestamps, and other suitable data related to the received request(s) and scope limited data. For example, the access to the user's secure information can be logged in any suitable data structure. In some implementations, the storage structure comprises a blockchain, and each request and/or instance of permitted access to the user's secure information is logged as a block of the blockchain.

At block 510, process 500 can provide the logged data in response to an audit request. Implementations can permit the user (or any other suitable entity or person) to audit the access to the user's secure information. The logged information, including the request(s), scope limited information accessed via the request(s), timestamps, and other suitable data related to the received request(s) and scope limited data can be provided to the user or other suitable audit entity.

Embodiments permit scope limited access to a user's secure information using credential authentication and user information verification. Certain information sharing protocols can require an explicit grant to share a user's secure information with a requesting computing system and/or entity. However, in some scenarios such an explicit grant may be impractical and/or impossible, such as when the user has lost consciousness or capacity to provide such an explicit grant. Embodiments of a secure information manager can permit a vetted entity scope limited access to a user's secure information in such scenarios, for example when the vetted entity provides an assertion that the user is unable to provide an explicit grant. For example, in emergency scenarios or any other suitable scenario with exigent circumstances, the secure information manager can permit the vetted entity access to a limited scope of user information that corresponds to the vetted entity's relationship to the user, role in a workflow, or other suitable characteristics of the vetted entity.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method for permitting limited access to a user's secure information, the method comprising:

receiving, at a secure information manager from a computing system of a vetted entity, a request to access a user's secure information, the request comprising identifying information of the user and one or more credentials issued to the vetted entity, wherein the identifying information of the user comprises multiple components of data including a) visual information for the user comprising a representation of an identifying document that comprises an image of the user or an image of the user's face or the user's eve, and b) one or more of: a user name and birthdate, user information obtained via scanning of a personalized portable access point of the user, biometric information sensed from the user's person, or any combination thereof;

validating that the identifying information of the user matches a preregistered person at the secure information manager by:

generating a confidence score based on matching information stored for the preregistered person with a) the identifying information of the user, and b) a geographic origin of the request, wherein the matching is performed by c) scoping a search of a data set of preregistered people using a first of the multiple components of data and/or the geographic origin of the request to identify a subset of preregistered people, and d) comparing the visual information of the user to visual information for the subset of preregistered people, and wherein the validating is performed in response to the confidence score meeting a criteria;

authenticating the one or more credentials and the vetted entity, wherein the authenticated one or more credentials permit the vetted entity scope limited access to the user's secure information for a limited duration of time; and permitting, in response to the validating and authenticating, the computing system associated with the vetted entity the scope limited access to the user's secure information for the limited duration of time.

2. The method of claim 1, wherein the one or more credentials comprise a token issued to the vetted entity after performing a vetting workflow, and the token comprises one of more of a blockchain managed non-fungible token, an access token, an electronic signature generated using a cryptographic key issued to the vetted entity, or any combination thereof.

3. The method of claim 1, wherein the access request comprises an assertion from the vetted entity that the user is incapacitated or unable to explicitly permit access to the user's secure information, and the scope limited access to the user's secure information is permitted in response to the assertion.

4. The method of claim 3, wherein the scope limited access to the user's secure information comprises access to scope limited data points of the user's secure information, the scope limited data points comprising a predefined correspondence to the assertion from the vetted entity.

5. The method of claim 1, wherein the vetted entity comprises a predefined role relative to the user, and the scope limited access to the user's secure information comprises access to scope limited data points of the user's secure information that correspond to the predefined role.

6. The method of claim 1, further comprising:

transmitting, in response to the request to access the user's secure information, a supplemental access permission request to one or more additional users that comprise a predefined relationship with the user, wherein the limited access is permitted in response to an explicit grant of the supplemental access permission request.

7. The method of claim 6, wherein the predefined relationship designates the additional users as guardians of the user's secure information.

8. The method of claim 6, wherein the supplemental access permission request is transmitted to one or more wireless devices of the one or more additional users, and the explicit grant of the supplemental access permission request is received from the one or more wireless devices.

9. The method of claim 8, wherein the supplemental access request is displayed to at least one of the additional users via at least one of the wireless devices as a priority notification that overrides a display of the one wireless device.

10. The method of claim 8, wherein the supplemental access request is displayed to at least one of the additional users via at least one of the wireless devices as an expiring notification with an expiration timer, and the at least one wireless device is configured to transmit the explicit grant of the supplemental access permission request in response to input prior to expiration of the expiration timer.

11. The method of claim 1, further comprising:

storing one or more logs of the scope limited access to the user's secure information, the logs comprising one or more of: the vetted entity, portions of the request, the user's secure information accessed by the computing system of the vetted entity, timestamps for the accessing of the user's secure information accessed, or any combination thereof.

12. The method of claim 11, wherein the one or more logs are recorded as blocks of an immutable blockchain.

13. The method of claim 11, further comprising:

providing, in response to an audit request from the user, at least a portion of the one or more stored logs.

14. The method of claim 1, further comprising:

transmitting, in response to the request to access the user's secure information, an access permission request to the user and one or more supplemental access permission requests to one or more additional users that comprise a predefined relationship with the user.

15. The method of claim 14, wherein the access permission request is transmitted to a wireless device of the user and the supplemental access permission requests are transmitted to one or more wireless devices of the one or more additional users.

16. The method of claim 15, wherein, the scope limited access to the user's secure information is permitted prior to receiving a response to the access permission request or the supplemental access permission requests, one or more responses to the access permission request or the supplemental access permission requests are received that disallow the scope limited access to the user's secure information, and the scope limited access to the user's secure information is terminated based on to the one or more responses.

17. The method of claim 1, wherein the confidence score is generated at least in part based on matching, via a computer vision model, the visual information for the user to the visual information visual information for the subset of preregistered people.

18. A non-transitory computer readable medium having instructions stored thereon that, when executed by a processor, cause the processor to permit limited access to a user's secure information, wherein, when executed, the instructions cause the processor to:

receive, at a secure information manager from a computing system of a vetted entity, a request to access a user's secure information, the request comprising identifying information of the user and one or more credentials issued to the vetted entity, wherein the identifying information of the user comprises multiple components of data including a) visual information for the user comprising a representation of an identifying document that comprises an image of the user or an image of the user's face or the user's eye, and b) one or more of: a user name and birthdate, user information obtained via scanning of a personalized portable access point of the user, biometric information sensed from the user's person, or any combination thereof;

validate that the identifying information of the user matches a preregistered person at the secure information manager by:

generating a confidence score based on matching information stored for the preregistered person with a) the identifying information of the user, and b) a geographic origin of the request, wherein the matching is performed by c) scoping a search of a data set of preregistered people using a first of the multiple components of data and/or the geographic origin of the request to identify a subset of preregistered people, and d) comparing the visual information of the user to visual information for the subset of preregistered people, and wherein the validating is performed in response to the confidence score meeting a criteria;

authenticate the one or more credentials and the vetted entity, wherein the authenticated one or more credentials permit the vetted entity scope limited access to the user's secure information for a limited duration of time; and permit, in response to the validating and authenticating, the computing system associated with the vetted entity the scope limited access to the user's secure information for the limited duration of time.

19. The non-transitory computer readable medium of claim 18, wherein the one or more credentials comprise a token issued to the vetted entity after performing a vetting workflow.

20. A system for permitting limited access to a user's secure information, the system comprising:

a processor; and a memory storing instructions for execution by the processor, the instructions configuring the processor to:

receive, at a secure information manager from a computing system of a vetted entity, a request to access a user's secure information, the request comprising identifying information of the user and one or more credentials issued to the vetted entity, wherein the identifying information of the user comprises multiple components of data including a) visual information for the user comprising a representation of an identifying document that comprises an image of the user or an image of the user's face or the user's eye, and b) one or more of: a user name and birthdate, user information obtained via scanning of a personalized portable access point of the user, biometric information sensed from the user's person, or any combination thereof;

validate that the identifying information of the user matches a preregistered person at the secure information manager by:

generating a confidence score based on matching information stored for the preregistered person with a) the identifying information of the user, and b) a geographic origin of the request, wherein the matching is performed by c) scoping a search of a data set of preregistered people using a first of the multiple components of data and/or the geographic origin of the request to identify a subset of preregistered people, and d) comparing the visual information of the user to visual information for the subset of preregistered people, and wherein the validating is performed in response to the confidence score meeting a criteria;

authenticate the one or more credentials and the vetted entity, wherein the authenticated one or more credentials permit the vetted entity scope limited access to the user's secure information for a limited duration of time; and permit, in response to the validating and authenticating, the computing system associated with the vetted entity the scope limited access to the user's secure information for the limited duration of time.

* * * * *